US012110910B2

(12) United States Patent
Watanabe et al.

(10) Patent No.: US 12,110,910 B2
(45) Date of Patent: Oct. 8, 2024

(54) COMPRESSOR FOR AUTOMOBILE AIR CONDITIONING DEVICE

(71) Applicant: MITSUBISHI HEAVY INDUSTRIES THERMAL SYSTEMS, LTD., Tokyo (JP)

(72) Inventors: Yasunori Watanabe, Tokyo (JP); Takayuki Hagita, Tokyo (JP); Shunsuke Yakushiji, Tokyo (JP); Ryoji Okabe, Tokyo (JP); Hideo Saho, Tokyo (JP)

(73) Assignee: MITSUBISHI HEAVY INDUSTRIES THERMAL SYSTEMS, LTD., Tokyo (JP)

( * ) Notice: Subject to any disclaimer, the term of this patent is extended or adjusted under 35 U.S.C. 154(b) by 364 days.

(21) Appl. No.: 17/442,397

(22) PCT Filed: Feb. 28, 2020

(86) PCT No.: PCT/JP2020/008418
§ 371 (c)(1),
(2) Date: Sep. 23, 2021

(87) PCT Pub. No.: WO2020/195547
PCT Pub. Date: Oct. 1, 2020

(65) Prior Publication Data

US 2022/0170484 A1 Jun. 2, 2022

(30) Foreign Application Priority Data

Mar. 25, 2019 (JP) ................................ 2019-057458

(51) Int. Cl.
*F04D 29/66* (2006.01)
*F04D 17/10* (2006.01)
(Continued)

(52) U.S. Cl.
CPC .......... *F04D 29/664* (2013.01); *F04D 17/10* (2013.01); *G10K 11/162* (2013.01); *G10K 11/172* (2013.01)

(58) Field of Classification Search
CPC ...... F04D 29/664; F04B 39/003; F04C 29/00; G10K 11/162; G10K 11/172
See application file for complete search history.

(56) References Cited

U.S. PATENT DOCUMENTS 5,431,601 A * 7/1995 Nakamura ............ A44B 19/16 277/630
7,398,855 B2 7/2008 Seel
(Continued)

FOREIGN PATENT DOCUMENTS

CN 1585348 A 1/2005
CN 1715674 A 1/2006
(Continued)

OTHER PUBLICATIONS

International Search Report and Written Opinion of the International Searching Authority for International Application No. PCT/JP2020/008418, dated Apr. 21, 2020, with English translation.

*Primary Examiner* — Forrest M Phillips
*Assistant Examiner* — Joseph James Peter Illicete
(74) *Attorney, Agent, or Firm* — Birch, Stewart, Kolasch & Birch, LLP

(57) ABSTRACT

A compressor (100) comprises a compressor body (10), a pipe (20) connected to the compressor body (10), and an acoustic cover disposed so as to surround the compressor body (10). The acoustic cover (30) has an insertion hole (31) through which the pipe (20) is inserted while being in close contact with the pipe (20), and an inner surface (30A) of the acoustic cover has a shape that traces an outer surface (10A) of the compressor body (10). Due to this configuration, it is possible to reduce the size and the weight of the acoustic
(Continued)

cover (30), and by using the acoustic cover (30) with a simpler structure, it is possible to reduce the noise of the compressor (100) of this automobile air conditioning device.

10 Claims, 10 Drawing Sheets

(51) Int. Cl.

| | |
|---|---|
| ***G10K 11/162*** | (2006.01) |
| ***G10K 11/172*** | (2006.01) |

(56) References Cited

U.S. PATENT DOCUMENTS

| | | | | |
|---|---|---|---|---|
| 9,068,458 | B2 * | 6/2015 | Ota | F04C 29/0021 |
| 2005/0274569 | A1 | 12/2005 | Seel | |
| 2017/0246602 | A1 | 8/2017 | Dean et al. | |

FOREIGN PATENT DOCUMENTS

| | | | |
|---|---|---|---|
| CN | 106988881 | A | 8/2017 |
| JP | 4-362377 | A | 12/1992 |
| JP | 8-61234 | A | 3/1996 |
| JP | 10-159726 | A | 6/1998 |
| JP | 10-159727 | A | 6/1998 |
| JP | 2012-122700 | A | 6/2012 |
| JP | 2012-202377 | A | 10/2012 |
| JP | 2020-7975 | A | 1/2020 |

* cited by examiner

COMPRESSOR FOR AUTOMOBILE AIR CONDITIONING DEVICE

TECHNICAL FIELD

The present invention relates to a compressor for an automobile air conditioning device.

BACKGROUND ART

In the related art, a technique for reducing noise that is generated from a compressor for an air conditioning device that is mounted on an automobile has been known. For example, PTL 1 discloses a soundproofing device for an electric compressor in which the periphery of the electric compressor that is used in a cooling device of, for example, an electric vehicle is covered with a sound insulation cover. This sound insulation cover has an insertion hole through which a refrigerant discharge pipe extending from the electric compressor is inserted, and a cushioning material made of an elastic material such as rubber is disposed around the discharge pipe, so that a case of the electric compressor is supported by the sound insulation cover through the discharge pipe.

CITATION LIST

Patent Literature

[PTL 1] Japanese Unexamined Patent Application Publication No. 8-61234

SUMMARY OF INVENTION

Technical Problem

Incidentally, in a compressor for an automobile air conditioning device, weight saving and downsizing of an acoustic cover are required. Therefore, unlike a normal air conditioning device, it is not preferable to use a heavy cover having high sound absorption performance, such as rubber. However, in the acoustic cover, generally, the soundproofing performance can be enhanced by using a heavy material, and therefore, there is a possibility that a desired soundproofing performance cannot be obtained merely by reducing the weight of the acoustic cover. In particular, if there is a gap between the acoustic cover and a pipe extending from the compressor, there is a possibility that sound may leak from the gap. In the acoustic cover (the sound insulation cover) disclosed in PTL 1, the cushioning material is disposed around the discharge pipe in order to support the case of the compressor while suppressing vibration of the case. However, the gap between the acoustic cover and the discharge pipe is not specified. Further, even if the cushioning material suppresses sound leakage from the gap between the acoustic cover and the discharge pipe, a structure becomes complicated.

The present invention has been made in view of the above and has an object to reduce noise of a compressor for an automobile air conditioning device by using an acoustic cover with a simpler structure, while attaining downsizing and weight saving of the acoustic cover.

Solution to Problem

In order to solve the problem described above and achieve the object, according to the present invention, there is provided a compressor for an automobile air conditioning device including: a compressor body; a pipe connected to the compressor body; and an acoustic cover disposed around the compressor body, in which the acoustic cover has an insertion hole through which the pipe is inserted, and which is in close contact with the pipe, and an inner surface thereof has a shape that follows an outer surface of the compressor body.

With this configuration, since the inner surface of the acoustic cover has a shape that follows the outer surface of the compressor body, it is possible to prevent a gap from being formed between the acoustic cover and the compressor body as much as possible. As a result, it is possible to restrain an unnecessary portion from being formed in the acoustic cover and to attain the downsizing and weight saving of the acoustic cover. Further, since the insertion hole which is formed in the acoustic cover and through which the pipe connected to the compressor is inserted is in close contact with the pipe, it is possible to suppress the occurrence of sound leakage from the gap between the acoustic cover and the pipe. Therefore, according to the present invention, it becomes possible to reduce noise of the compressor for an automobile air conditioning device by using the acoustic cover having a simpler structure, while attaining the downsizing and weight saving of the acoustic cover.

Further, it is preferable that the acoustic cover is a porous foam material. With this configuration, it is possible to absorb noise that is emitted from the compressor body by the porous foam material while attaining the weight saving of the acoustic cover.

Further, it is preferable that the acoustic cover has at least one divided portion formed in a wall portion extending along a lateral direction. With this configuration, in a case where the acoustic cover is formed by foam molding, the surface on which a draft gradient from a mold is provided can be located on the lateral direction side of the acoustic cover. As a result, the length of the surface on which the draft gradient is provided can be shortened, and the formation of an extra space between the compressor and the acoustic cover can be suppressed. Therefore, it is possible to attain the downsizing and weight saving of the acoustic cover.

Further, it is preferable that the acoustic cover has an overlap portion in which half portions divided at the divided portion overlap each other at the position of the divided portion. With this configuration, since the half portions can be brought into closer contact with each other at the divided portion, it is possible to suppress the occurrence of sound leakage from the divided portion.

Further, it is preferable that the overlap portion is a fitting portion that fits the half portions to each other. With this configuration, the half portions can be stably connected to each other, and the half portions can be brought into closer contact with each other to suppress the occurrence of sound leakage from the divided portion.

Further, it is preferable that the acoustic cover has a protrusion portion that protrudes from the outer surface thereof at the position of the overlap portion. With this configuration, since the rigidity in the vicinity of the overlap portion can be increased, so that deformation when the acoustic cover is assembled to the compressor body can be suppressed, it becomes possible to improve the assemblyability.

Further, it is preferable that the acoustic cover has a resin material inserted at the position of the overlap portion. With this configuration, since the rigidity in the vicinity of the overlap portion can be increased, so that deformation when the acoustic cover is assembled to the compressor body can be suppressed, it becomes possible to improve the assembly-ability.

Further, it is preferable that the compressor body has a protrusion that protrudes from the outer surface thereof and the overlap portion of the acoustic cover comes into contact with the protrusion. With this configuration, when the acoustic cover is assembled to the compressor body, the overlap portion is pressed against the protrusion of the compressor body, so that the deformation of the overlap portion is suppressed. As a result, it is possible to improve the assembly-ability.

Further, it is preferable that the overlap portion is a locking portion that locks the half portions to each other, a plurality of locking surfaces are formed on surfaces of the locking portions that face each other, and the plurality of locking surfaces include at least first locking surfaces which come into contact with each other when the locking portions relatively move in a direction in which the locking portions approach each other, and second locking surfaces which come into contact with each other when the locking portions relatively move in a direction in which the locking portions are separated from each other. With this configuration, for example, even in a case where the locking portions are separated from each other or approach each other due to vibration, due to the first locking surfaces and the second locking surfaces, it is possible to suppress the formation of a gap between the locking portions.

Further, it is preferable that the acoustic cover is a honeycomb sandwich panel having a plurality of honeycomb cells and has a plurality of openings formed on an inner surface corresponding to the plurality of honeycomb cells. With this configuration, it is possible to absorb noise which is emitted from the compressor body by the plurality of honeycomb cells while attaining the weight saving of the acoustic cover. Further, the honeycomb sandwich has a plurality of openings, so that it becomes possible to absorb noise having a plurality of frequencies by adjusting an opening diameter.

Further, it is preferable that the acoustic cover has at least one divided portion formed in a wall portion extending along a lateral direction. With this configuration, in a case where the acoustic cover is formed by foam molding, the surface on which a draft gradient from a mold is provided can be located on the lateral direction side of the acoustic cover. As a result, the length of the surface on which the draft gradient is provided can be shortened, and the formation of an extra space between the compressor and the acoustic cover can be suppressed. Therefore, the acoustic cover can be made smaller and lighter.

DESCRIPTION OF EMBODIMENTS

Hereinafter, embodiments of a compressor for an automobile air conditioning device according to the present invention will be described in detail based on the drawings. The present invention is not limited by these embodiments.

First Embodiment

Figure 1:
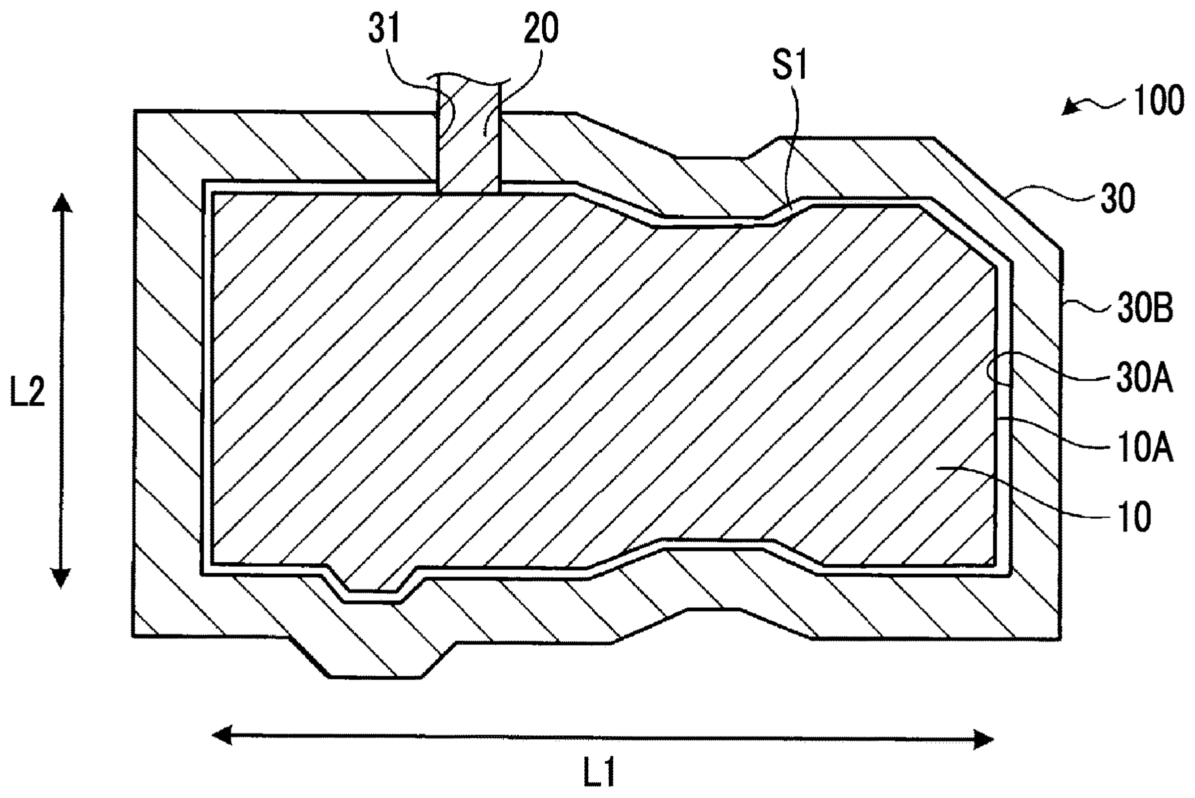
FIG. 1 is a sectional view showing a compressor according to a first embodiment.

FIG. 1 is a sectional view showing a compressor according to a first embodiment. A compressor 100 according to the embodiment is a compressor for an automobile air conditioning device that is used in an air conditioning device that is mounted on an automobile (not shown). The compressor 100 includes a compressor body 10, a plurality of pipes 20, and an acoustic cover 30. FIG. 1 shows a cross section taken along a longitudinal direction of the compressor body 10. The longitudinal direction of the compressor body 10 is a longitudinal direction of the acoustic cover 30, and a lateral direction of the compressor body 10 is a lateral direction of the acoustic cover 30. In the following description, the longitudinal direction of the compressor body 10 and the acoustic cover 30 is simply referred to as a “longitudinal direction L1”, and the lateral direction of the compressor body 10 and the acoustic cover 30 is simply referred to as a “lateral direction L2”.

The compressor body 10 is an electric compressor, and accommodates compression mechanisms such as an electric motor, a fixed scroll, and a movable scroll (none of which is shown) in a housing. The compressor body 10 compresses a low-pressure refrigerant gas sucked into the housing by the compression mechanisms and flows out it as a high-temperature and high-pressure gas to the outside. The compressor body 10 is disposed in an engine room of an automobile, and is fastened and fixed to a vehicle body of the automobile by, for example, bolts as fasteners, at a vehicle body mounting portion (not shown).

Figure 2:
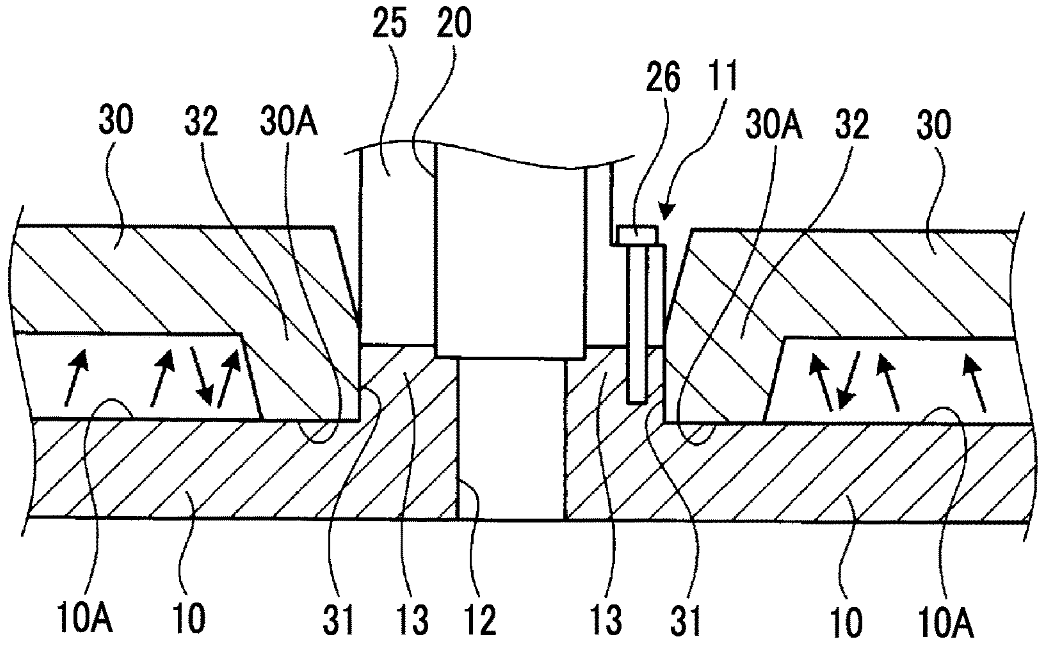
FIG. 2 is an enlarged sectional view showing an example of a structure in the vicinity of a connecting portion of a pipe to a compressor body.

The plurality of pipes 20 are connected to an outer surface 10A of the compressor body 10. The pipes 20 are, for example, a suction pipe for sucking the refrigerant gas, a discharge pipe for discharging the refrigerant gas, and the like. In FIG. 1, only one pipe 20 is shown as exemplification. FIG. 2 is an enlarged sectional view showing an example of a structure in the vicinity of a connecting portion of the pipe to the compressor body. As shown in the drawing, the compressor body 10 has a connection hole 12 formed to communicate with the inside of the pipe 20 at a connecting portion 11 to which the pipe 20 is connected. Then, a flange portion 13 that protrudes from the outer surface 10A is formed around the connection hole 12. The tip of the pipe 20 is fitted to a step portion of the flange portion 13. Further, a connection block 25 is fixed around the pipe 20, and the connection block 25 is fastened to the flange portion 13 by a bolt 26. In this way, the pipe 20 is mounted to the compressor body 10.

The acoustic cover 30 is disposed around the compressor body 10. In the first embodiment, the acoustic cover 30 is formed of a porous foam material. The acoustic cover 30 is formed by foam molding using the inside of a mold (not shown). The acoustic cover 30 reduces noise by converting sound energy of the noise that is emitted from the compressor body 10 into thermal energy at a plurality of cavity portions included in the porous foam material, to suppress leakage of the noise to the outside.

The acoustic cover 30 covers the outer surface 10A of the compressor body 10 except for the vehicle body mounting portion (not shown) of the compressor body 10 and the connecting portion of the pipe 20 which will be described later. Hereinafter, the outer surface 10A of the compressor body 10 will be described as referring to the outer surface of a portion of the compressor body 10 excluding the vehicle body mounting portion (not shown) and the connecting portion of the pipe 20. The acoustic cover 30 is fastened and fixed to the compressor body 10 by, for example, bolts at a main body mounting portion (not shown).

As shown in FIG. 1, the acoustic cover 30 has an inner surface 30A that follows along the shape of the outer surface 10A of the compressor body 10. In other words, the inner surface 30A of the acoustic cover 30 is formed at a size that covers the outer surface 10A and in the same shape as the outer surface 10A of the compressor body 10. As a result, a gap S1 that is formed between the inner surface 30A of the acoustic cover 30 and the outer surface 10A of the compressor body 10 can be made as small as possible. The inner surface 30A of the acoustic cover 30 and the outer surface 10A of the compressor body 10 may be in contact with each other such that the gap S1 is not formed. Further, an outer surface 30B of the acoustic cover 30 has a shape that follows the outer surface 10A of the compressor body 10, similar to the inner surface 30A. The outer surface 30B may be designed so as to be able to reduce the weight of the compressor body 10 to which the acoustic cover 30 is mounted and to avoid the interference with a member that is disposed around the compressor body 10.

Further, as shown in FIG. 1, the acoustic cover 30 has an insertion hole 31 through which the pipe 20 that is connected to the compressor body 10 is inserted. Although the insertion holes 31 are not shown similar to the pipes 20, the insertion holes 31 are formed at all positions corresponding to the pipes 20. As shown in FIG. 2, the acoustic cover 30 has, around the insertion hole 31, an annular inclined portion 32 that extends toward the inside of the acoustic cover 30 (the compressor body 10 side) as it goes toward the insertion hole 31. An inner peripheral surface 31A of the insertion hole 31 corresponds to the inner peripheral surface of the annular inclined portion 32. Then, the inner peripheral surface 31A of the insertion hole 31 is fitted to the flange portion 13 and the connection block 25 provided at the connecting portion 11, at the annular inclined portion 32. That is, the inner peripheral surface 31A of the insertion hole 31 is indirectly brought into close contact with the pipe 20 through the flange portion 13 and the connection block 25. In this way, it is possible to prevent a gap from being formed between the insertion hole 31 and the pipe 20. Further, as shown in FIG. 2, the inner surface 30A at the trailing end portion of the annular inclined portion 32 comes into contact with the outer surface 10A of the compressor body 10. In this way, the acoustic cover 30 can be stably mounted around the pipe 20 (around the connecting portion 11).

Figure 3:
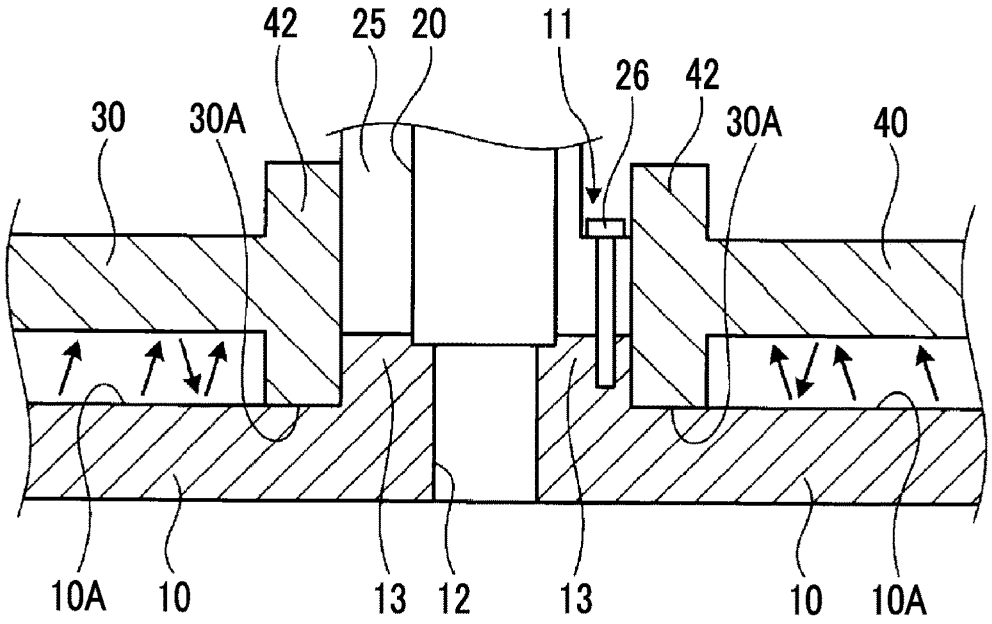
FIG. 3 is an enlarged sectional view showing an acoustic cover according to a modification example of the first embodiment.

FIG. 3 is an enlarged sectional view showing an acoustic cover according to a modification example of the first embodiment. An acoustic cover 40 according to the modification example has a cylindrical portion 42 instead of the annular inclined portion 32 of the acoustic cover 30. Since the other configurations of the acoustic cover 40 are the same as those of the acoustic cover 30, the description of the same configurations is omitted and the same reference numerals are given. The cylindrical portion 42 of the acoustic cover 40 protrudes in a cylindrical shape toward the inside of the acoustic cover 40 (the compressor body 10 side) and the outside of the acoustic cover 40 (the side opposite to the compressor body 10) around the insertion hole 31. The inner peripheral surface 31A of the insertion hole 31 corresponds to the inner peripheral surface of the cylindrical portion 42. Then, similar to the example shown in FIG. 2, the inner peripheral surface 31A of the insertion hole 31 is fitted to the flange portion 13 and the connection block 25 provided at the connecting portion 11. That is, the inner peripheral surface 31A of the insertion hole 31 is indirectly brought into close contact with the pipe 20 through the flange portion 13 and the connection block 25. In this way, it is possible to prevent a gap from being formed between the insertion hole 31 and the pipe 20. Further, as shown in FIG. 3, in the cylindrical portion 42, the inner surface 30A comes into contact with the outer surface 10A of the compressor body 10. In this way, the acoustic cover 30 can be stably mounted around the pipe 20 (around the connecting portion 11).

As described above, the compressor 100 according to the first embodiment includes the compressor body 10, the pipe 20 connected to the compressor body 10, and the acoustic cover 30 disposed around the compressor body 10, and the acoustic cover 30 has the insertion hole 31 through which the pipe 20 is inserted and which is in close contact with the pipe 20, and the inner surface 30A thereof has a shape that follows the outer surface 10A of the compressor body 10.

With this configuration, since the inner surface 30A of the acoustic cover 30 has a shape that follows the outer surface 10A of the compressor body 10, it is possible to prevent the gap S1 from being formed between the acoustic cover 30 and the compressor body 10 as much as possible. As a result, it is possible to restrain an unnecessary portion from being formed in the acoustic cover 30 and to attain the downsizing and weight saving of the acoustic cover 30. Further, since the insertion hole 31 which is formed in the acoustic cover 30 and through which the pipe 20 connected to the compressor body 10 is inserted is in close contact with the pipe 20, as shown by a solid line arrow in FIG. 2, it is possible to suppress the occurrence of sound leakage from the gap between the acoustic cover 30 and the pipe 20. Therefore, according to the first embodiment, it becomes possible to reduce noise of the compressor 100 for an automobile air conditioning device by using the acoustic cover 30 having a simpler structure, while attaining the downsizing and weight saving of the acoustic cover 30.

In the present embodiment, as shown in FIGS. 2 and 3, the pipe 20 is fixed to the compressor body 10 by the flange portion 13 and the connection block 25 at the connecting portion 11, and the insertion hole 31 of the acoustic cover 30 is indirectly brought into close contact with the pipe 20 through the flange portion 13 and the connection block 25. However, a method of fixing the pipe 20 to the compressor body 10 is not limited to this example, and the insertion hole 31 of the acoustic cover 30 may be directly brought into contact with the pipe 20.

Further, the acoustic cover 30 is a porous foam material. With this configuration, it is possible to absorb noise that is emitted from the compressor body 10 by the porous foam material while attaining the weight saving of the acoustic cover 30.

Second Embodiment

Figure 4:
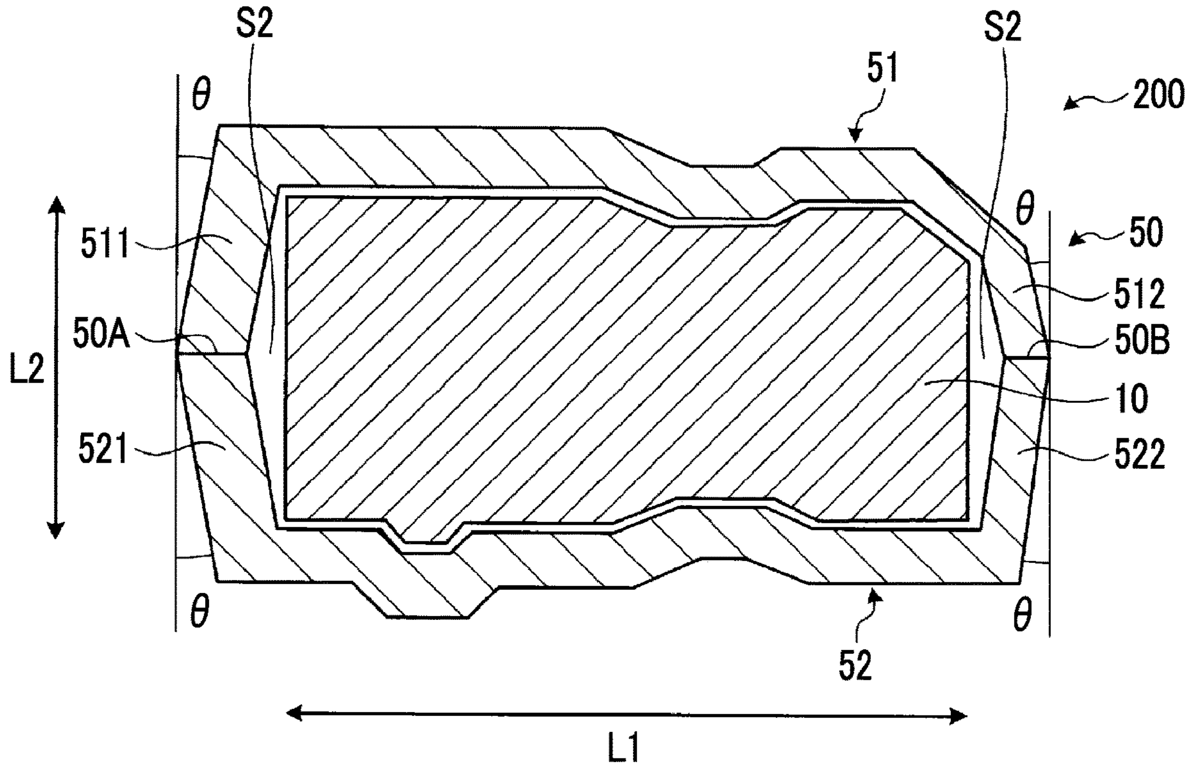
FIG. 4 is a sectional view showing a compressor according to a second embodiment.

Next, a compressor 200 according to a second embodiment will be described. FIG. 4 is a sectional view showing the compressor according to the second embodiment, FIG. 5 is a sectional view showing a state where an acoustic cover is mounted to the compressor according to the second embodiment, and FIG. 6 is a sectional view showing a compressor as a comparative example.

The compressor 200 according to the second embodiment includes an acoustic cover 50 instead of the acoustic cover 30 of the compressor 100. Further, a compressor 300 as a comparative example includes an acoustic cover 60 instead of the acoustic cover 30 of the compressor 100. Since the other configurations of the compressors 200 and 300 are the same as those of the compressor 100, the description of the same configurations is omitted and the same reference numerals are given. FIGS. 4 to 6 show a cross section taken along the longitudinal direction L1, similar to FIG. 1. Further, in FIGS. 4 to 6, the description of the pipe 20 is omitted. However, similar to the first embodiment, in the acoustic covers 50 and 60, the insertion hole through which the pipe 20 is inserted is directly or indirectly brought into contact with the pipe 20.

Figure 5:
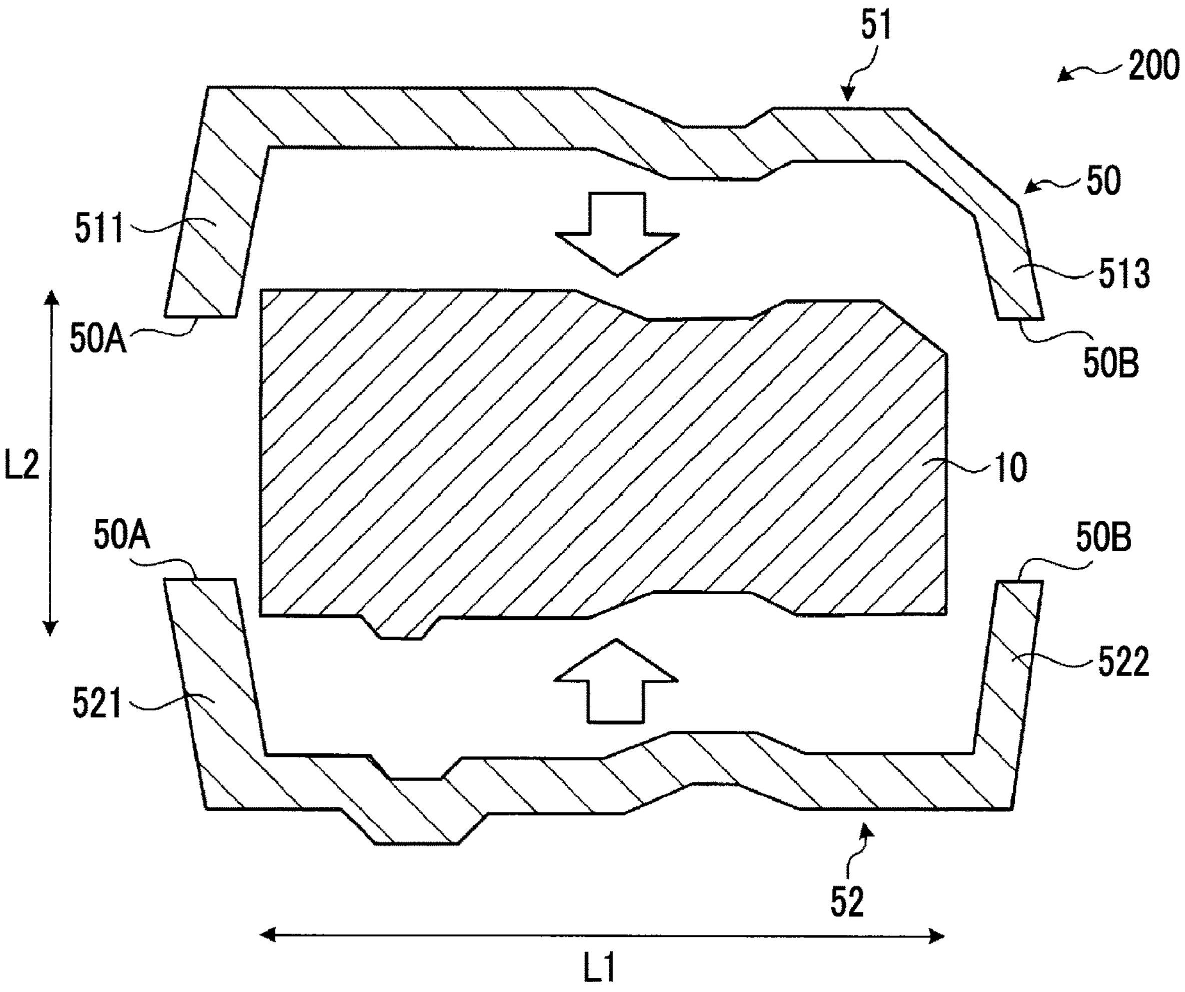
FIG. 5 is a sectional view showing a state where an acoustic cover is mounted to the compressor according to the second embodiment.
Figure 6:
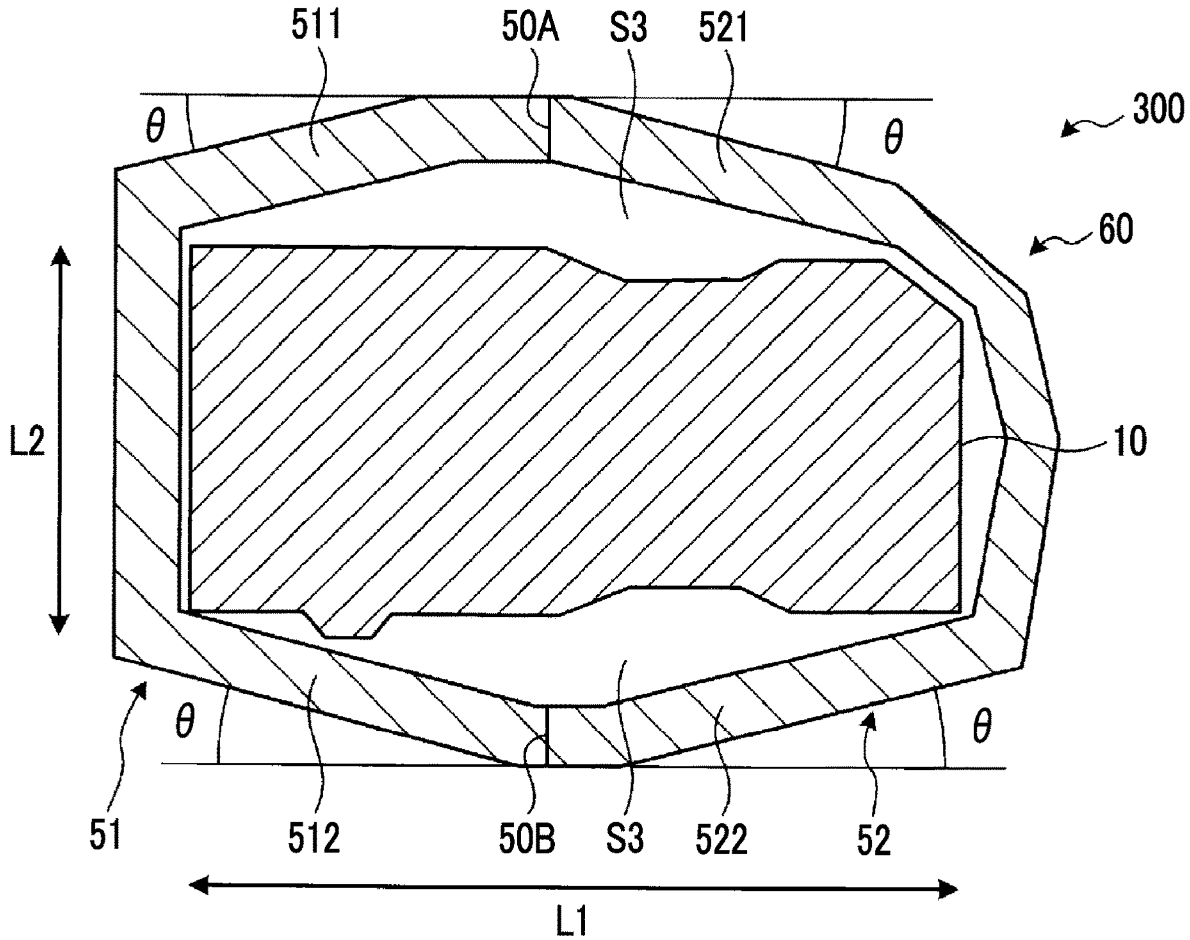
FIG. 6 is a sectional view showing a compressor as a comparative example.
Figure 7:
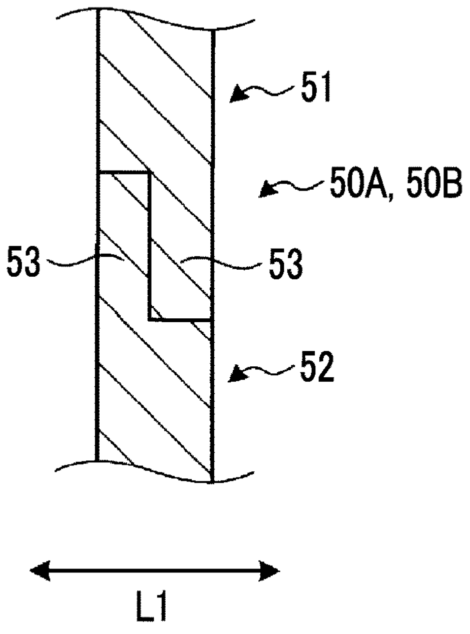
FIG. 7 is an enlarged sectional view showing an example of a structure in the vicinity of a divided portion.

As shown in FIGS. 4 and 5, the acoustic cover 50 is divided into two half portions 51 and 52 at divided portions 50A and 50B. As shown in FIG. 5, the half portions 51 and 52 are disposed around the compressor body 10 while facing each other, and are fastened to each other by, for example, bolts in the vicinity of the divided portions 50A and 50B. As shown in the drawings, the divided portions 50A and 50B are provided in a wall portion extending along the lateral direction L2 of the acoustic cover 30. In other words, the divided portions 50A and 50B extend in the direction along the longitudinal direction L1. The expression "extending along the longitudinal direction L1" may include being inclined with respect to the longitudinal direction L1. Further, in the present embodiment, the divided portions 50A and 50B are formed at positions disposed side by side in the lateral direction L2. However, the divided portions 50A and 50B may be formed at positions separated from each other in the lateral direction L2.

As shown in FIG. 4, the half portion 51 of the acoustic cover 50 has an inclined portion 511 extending toward the outside of the acoustic cover 50 (the side opposite to the compressor body 10) as it goes toward the divided portion 50A. Further, the half portion 51 has an inclined portion 512 extending toward the outside of the acoustic cover 50 (the side opposite to the compressor body 10) as it goes toward the divided portion 50B. Similarly, as shown in FIG. 4, the half portion 52 of the acoustic cover 50 has an inclined portion 521 extending toward the outside of the acoustic cover 50 (the side opposite to the compressor body 10) as it goes toward the divided portion 50A. Further, the half portion 52 has an inclined portion 522 extending toward the outside of the acoustic cover 50 (the side opposite to the compressor body 10) as it goes toward the divided portion 50B.

The inclined portions 511, 512, 521, and 522 which are provided in the half portions 51 and 52 are formed at an angle of a draft gradient θ for extracting the half portions 51 and 52 from a mold (not shown) when the acoustic cover 30 is foam-molded. That is, the inclined portions 511, 512, 521, and 522 extend while being inclined at the angle of the draft gradient θ with respect to the lateral direction L2. The draft gradient θ of each of the inclined portions 511, 512, 521, and 522 may be determined to a value at which the half portions 51 and 52 can be extracted from the mold and a gap S2 (described later) becomes as small as possible, and may be a different value for each of the inclined portions 511, 512, 521, and 522. Since the divided portions 50A and 50B for dividing the half portions 51 and 52 are provided in the wall portions extending along the lateral direction L2 of the acoustic cover 30, the inclined portions 511, 512, 521, and 522 are also provided in the wall portions extending along the lateral direction L2 of the acoustic cover 30.

Here, in the acoustic cover 60 of the compressor 300 of the comparative example, as shown in FIG. 6, the divided portions 50A and 50B for dividing the half portions 51 and 52 are formed in the wall portions extending along the longitudinal direction L1 of the acoustic cover 60. That is, in the acoustic cover 60, the inclined portions 511, 512, 521, and 522 are formed in the wall portions extending along the longitudinal direction L1. Since the other configurations of the acoustic cover 60 are the same as those of the acoustic cover 50, the description of the same configurations is omitted and the same reference numerals are given.

As shown in FIGS. 4 and 6, in the acoustic cover 50 in which the inclined portions 511, 512, 521, and 522 are provided in the wall portions extending along the lateral direction L2, the lengths of the inclined portions 511, 512, 521, and 522 become short as compared with the acoustic cover 60. In this way, the gap S2 between the acoustic cover 50 and the compressor body 10 in the compressor 200 according to the second embodiment becomes small as compared with a gap S3 between the acoustic cover 60 and the compressor body 10 in the compressor 300 of the comparative example. Therefore, it is possible to suppress the formation of an extra space between the compressor body 10 and the acoustic cover 50, and it becomes possible to attain the downsizing and weight saving of the acoustic cover 50, as compared with the acoustic cover 60 of the comparative example.

Next, the structures of the divided portions 50A and 50B will be described with reference to FIGS. 7 to 11. FIGS. 7 to 11 are enlarged sectional views showing examples of the structure in the vicinity of the divided portion. In the example shown in FIG. 7, the half portions 51 and 52 have overlap portions 53 that are disposed side by side and overlap each other in the direction along the longitudinal direction L1 at the positions of the divided portions 50A and 50B. With this configuration, since the half portions 51 and 52 can be brought into closer contact with each other at the divided portions 50A and 50B, it is possible to suppress the occurrence of sound leakage from the divided portions 50A and 50B.

Figure 8:
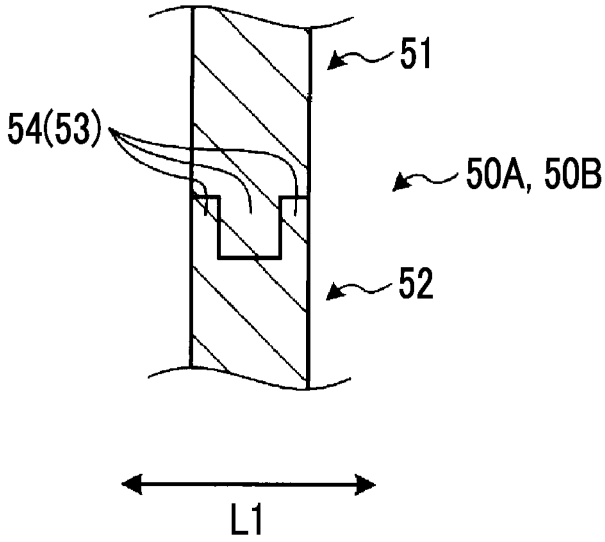
FIG. 8 is an enlarged sectional view showing an example of a structure in the vicinity of a divided portion.

In the example shown in FIG. 8, the overlap portion 53 is a fitting portion 54 that fits the half portions 51 and 52 to each other. With this configuration, the half portions 51 and 52 can be stably connected to each other, and the half portions 51 and 52 can be brought into closer contact with each other to suppress the occurrence of sound leakage from the divided portions 50A and 50B.

Figure 9:
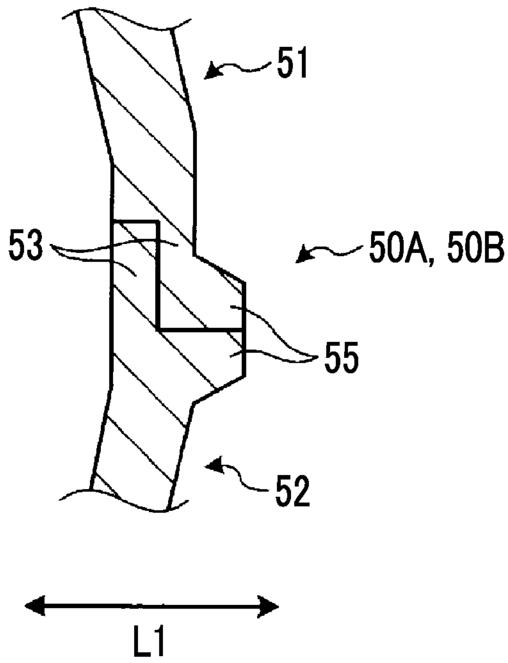
FIG. 9 is an enlarged sectional view showing an example of a structure in the vicinity of a divided portion.

In the example shown in FIG. 9, each of the half portions 51 and 52 has a protrusion portion 55 that protrudes from the outer surface thereof at the position of the overlap portion 53. With this configuration, since the rigidity in the vicinity of the overlap portion 53 can be increased, so that deformation when the acoustic cover 50 is assembled to the compressor body 10 can be suppressed, it becomes possible to improve the assembly-ability.

Figure 10:
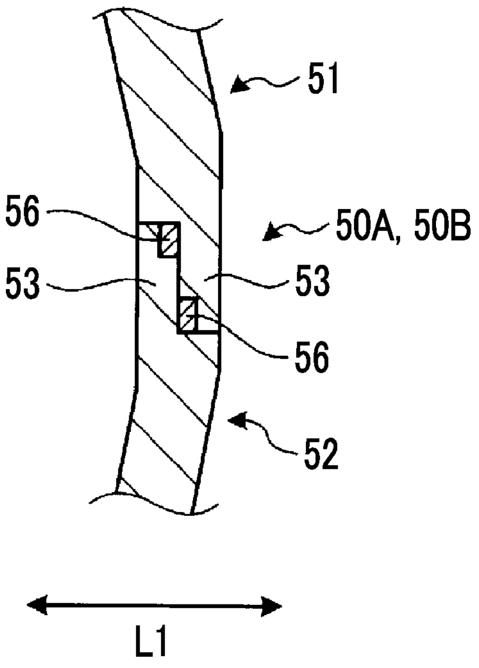
FIG. 10 is an enlarged sectional view showing an example of a structure in the vicinity of a divided portion.

In the example shown in FIG. 10, each of the half portions 51 and 52 has a resin material 56 inserted at the position of the overlap portion 53. With this configuration, since the rigidity in the vicinity of the overlap portion 53 can be increased, so that deformation when the acoustic cover 50 is assembled to the compressor body 10 can be suppressed, it becomes possible to improve the assembly-ability.

Figure 11:
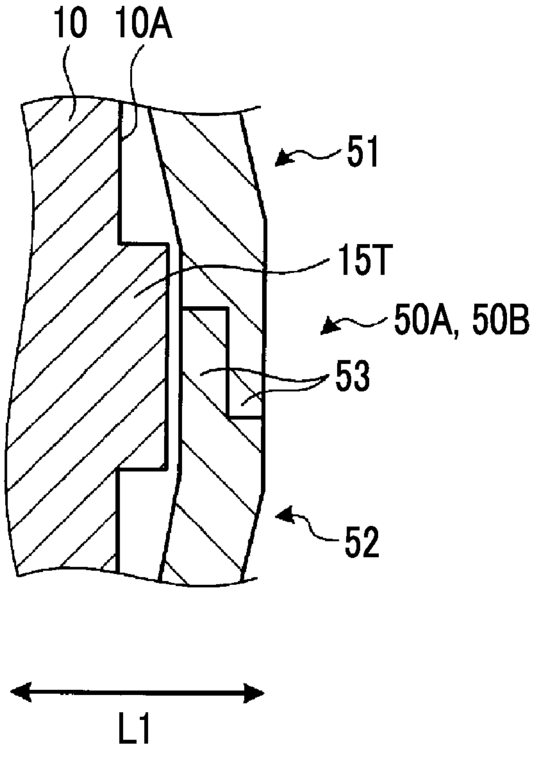
FIG. 11 is an enlarged sectional view showing an example of a structure in the vicinity of a divided portion.

In the example shown in FIG. 11, in the half portions 51 and 52, the overlap portion 53 is provided at a position where it comes into contact with a protrusion 15 formed on the compressor body 10. The protrusion 15 is a portion that protrudes from the outer surface 10A of the compressor body 10. With this configuration, when the acoustic cover 50 is assembled to the compressor body 10, the overlap portion 53 is pressed against the protrusion 15 of the compressor body 10 from the state shown in FIG. 11, so that the deformation of the overlap portion 53 is suppressed. As a result, it is possible to improve the assembly-ability of the acoustic cover 50.

Figure 12:
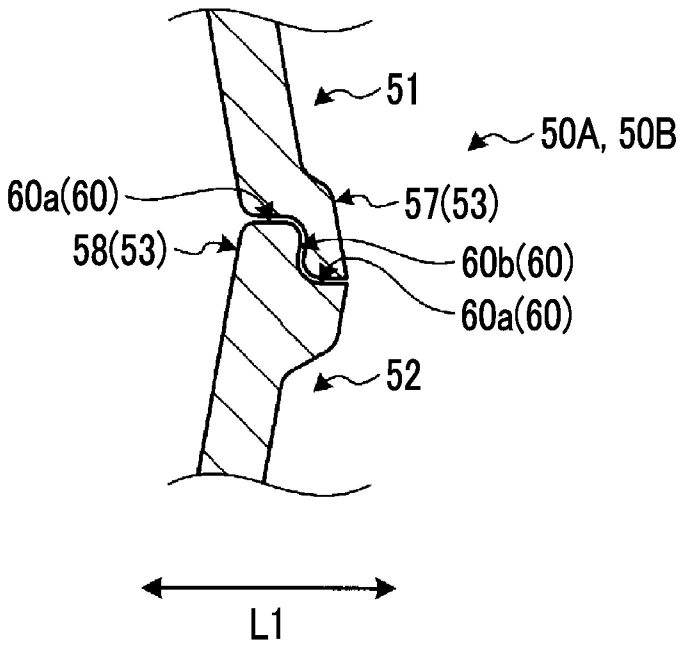
FIG. 12 is an enlarged sectional view showing an example of a structure in the vicinity of a divided portion.

In the example shown in FIG. 12, the overlap portion 53 is a locking portion that locks the half portions 51 and 52 to each other. The locking portion includes a first locking portion 57 provided in the half portion 51 on one side (the upper side) and a second locking portion 58 provided in the half portion 52 on the other side (the lower side). The first locking portion 57 and the second locking portion 58 are disposed side by side and overlap each other in the direction along the longitudinal direction L1. The first locking portion 57 is located on the outer side of the acoustic cover 50 with respect to the second locking portion 58. In other words, the second locking portion 58 is located on the inner side of the acoustic cover 50 with respect to the first locking portion 57. The second locking portion 58 is locked to the first locking portion 57. In the first locking portion 57 and the second locking portion 58, a plurality of locking surfaces 60 are formed on the surfaces of the first locking portion 57 and the second locking portion 58 that face each other.

The plurality of locking surfaces 60 include a first locking surfaces 60*a* and a second locking surfaces 60*b*. The first locking surfaces 60*a* are the locking surfaces 60 that come into contact with each other when the first locking portion 57 and the second locking portion 58 relatively move in a direction in which they approach each other. The first locking surfaces 60*a* are formed so as to be located on both sides in the longitudinal direction L1. The first locking surface 60*a* is a surface extending along the longitudinal direction L1. The first locking surface 60*a* on the inner side the acoustic cover 50 is formed to be located on the half portion 51 side (the upper side) in the lateral direction L2, and the first locking surface 60*a* on the outer side the acoustic cover 50 is formed to be located on the half portion 52 side (the lower side) in the lateral direction L2.

The second locking surfaces 60*b* are the locking surfaces 60 that come into contact with each other when the first locking portion 57 and the second locking portion 58 relatively move in a direction in which they are separated from each other. The second locking surface 60*b* is formed to be located between the first locking surfaces 60*a* on both sides in the longitudinal direction L1. The second locking surface 60*b* is a surface extending along the direction in which the first locking portion 57 and the second locking portion 58 face each other. Both sides of the second locking surface 60*b* are respectively connected to the first locking surfaces 60*a* on both sides. The second locking surface 60*b* is inclined inward in the longitudinal direction L1 from the first locking portion 57 toward the second locking portion 58.

The surface on which the first locking portion 57 and the second locking portion 58 face each other is a continuous surface in which the first locking surfaces 60*a* on both sides and the second locking surface 60*b* are continuous, and is a surface with a Z-shaped cross section. The surface on which the first locking portion 57 and the second locking portion 58 face each other may be a discontinuous surface in which the first locking surface 60*a* and the second locking surface 60*b* are discontinuous. That is, the connecting portion between the first locking surface 60*a* and the second locking surface 60*b* may be bent.

In the example shown in FIG. 12, when the first locking portion 57 and the second locking portion 58 relatively move in a direction in which they approach each other, the first locking surfaces 60*a* on both sides in the longitudinal direction L1 come into contact with each other, so that the gap between the half portions 51 and 52 is closed. On the other hand, when the first locking portion 57 and the second locking portion 58 relatively move in a direction in which they are separated from each other, the second locking surfaces 60*b* at the center in the longitudinal direction L1 come into contact with each other, so that the gap between the half portions 51 and 52 is closed. With this configuration, even in a case where the half portions 51 and 52 vibrate, the formation of a gap between the half portions 51 and 52 can be suppressed, so that it is possible to suppress the occurrence of sound leakage from the divided portions 50A and 50B.

Figure 13:
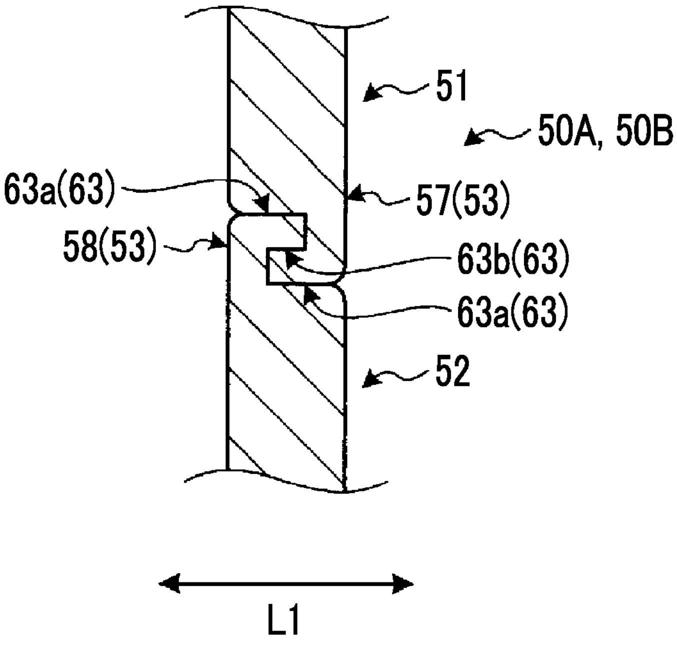
FIG. 13 is an enlarged sectional view showing an example of a structure in the vicinity of a divided portion.

In the example shown in FIG. 13, the shapes of the first locking portion 57 and the second locking portion 58 of the example shown in FIG. 12 are different. That is, in FIG. 13, a plurality of locking surfaces 63 which are formed on the surfaces of the first locking portion 57 and the second locking portion 58 that face each other are different from those in FIG. 12.

The plurality of locking surfaces 63 include a first locking surface 63*a* and a second locking surface 63*b*. The first locking surfaces 63*a* are the locking surfaces 63 that come into contact with each other when the first locking portion 57 and the second locking portion 58 relatively move in a direction in which they approach each other, similar to FIG. 12. The first locking surfaces 63*a* are formed to be located on both sides in the longitudinal direction L1. The first locking surface 63*a* is a surface extending along the longitudinal direction L1. The first locking surface 63*a* on the inner side of the acoustic cover 50 is formed to be located on the half portion 51 side (the upper side) in the lateral direction L2, and the first locking surface 63*a* on the outer side of the acoustic cover 50 is formed to be located on the half portion 52 side (the lower side) in the lateral direction L2.

The second locking surfaces 63*b* are the locking surfaces 63 that come into contact with each other when the first locking portion 57 and the second locking portion 58 relatively move in a direction in which they are separated from each other, similar to FIG. 12. The second locking surface 63*b* is formed to be located between the first locking surfaces 63*a* on both sides in the longitudinal direction L1. The second locking surface 63*b* is a surface extending along the longitudinal direction L1. Then, the second locking surface 63*b* is formed to be located between the first locking surfaces 63*a* on both sides in the direction in which the first locking portion 57 and the second locking portion 58 face each other. Therefore, the second locking surface 63*b* is a surface parallel to the first locking surfaces 63*a* on both sides. Both sides of the second locking surface 63*b* are respectively connected to the first locking surfaces 63*a* on both sides through a connection surface.

The surface on which the first locking portion 57 and the second locking portion 58 face each other is a discontinuous surface in which the first locking surfaces 63*a* on both sides, the second locking surface 63*b*, and the connection surface are discontinuous, and is a surface having a rectangular cross section.

In the example shown in FIG. 13, when the first locking portion 57 and the second locking portion 58 relatively move in a direction in which they approach each other, the first locking surfaces 63*a* on both sides in the longitudinal direction L1 come into contact with each other, so that the gap between the half portions 51 and 52 is closed. On the other hand, when the first locking portion 57 and the second locking portion 58 relatively move in a direction in which they are separated from each other, the second locking surfaces 63*b* at the center in the longitudinal direction L1 come into contact with each other, so that the gap between the half portions 51 and 52 is closed. With this configuration, even in a case where the half portions 51 and 52 vibrate, the formation of a gap between the half portions 51 and 52 can be suppressed, so that it is possible to suppress the occurrence of sound leakage from the divided portions 50A and 50B.

Figure 14:
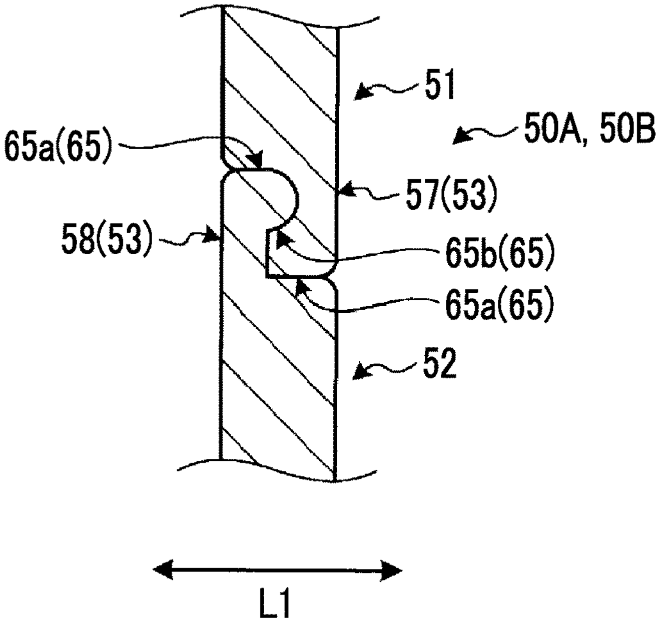
FIG. 14 is an enlarged sectional view showing an example of a structure in the vicinity of a divided portion.

In the example shown in FIG. 14, the shapes of the first locking portion 57 and the second locking portion 58 of the example shown in FIG. 12 are different. That is, in FIG. 14, a plurality of locking surfaces 65 which are formed on the surfaces of the first locking portion 57 and the second locking portion 58 that face each other are different from those in FIG. 12.

The plurality of locking surfaces 65 include a first locking surface 65*a* and a second locking surface 65*b*. Since the first locking surface 65*a* is the same as the first locking surface 60*a* in FIG. 12, the description thereof is omitted.

The second locking surfaces 65*b* are locking surfaces 65 that come into contact with each other when the first locking portion 57 and the second locking portion 58 relatively move in a direction in which they are separated from each other, similar to FIG. 12. The second locking surface 65*b* is a surface continuous with the first locking surface 65*a* formed on the first locking portion 57 side. A continuous part between the second locking surface 65*b* and a part of the first locking surface 65*a* is a continuous surface having a semi-circular cross-sectional shape. The second locking surface 65*b* is connected to the first locking surface 65*a* formed on the second locking portion 58 side through a connection surface.

The surface on which the first locking portion 57 and the second locking portion 58 face each other is a continuous surface in which the first locking surface 65*a* and the second locking surface 65*b* on the first locking portion 57 side are continuous in a semicircular cross-sectional shape, and the connection surface and the first locking surface 65*a* on the second locking portion 58 side are discontinuous surfaces forming an L-shaped cross section which is discontinuous.

In the example shown in FIG. 14, when the first locking portion 57 and the second locking portion 58 relatively move in a direction in which they approach each other, the first locking surfaces 65*a* on both sides in the longitudinal direction L1 come into contact with each other, so that the gap between the half portions 51 and 52 is closed. On the other hand, when the first locking portion 57 and the second locking portion 58 relatively move in a direction in which they are separated from each other, the second locking surfaces 65*b* having a semicircular cross-sectional shape come into contact with each other, so that the gap between the half portions 51 and 52 is closed. With this configuration, even in a case where the half portions 51 and 52 vibrate, the formation of a gap between the half portions 51 and 52 can be suppressed, so that it is possible to suppress the occurrence of sound leakage from the divided portions 50A and 50B.

Figure 15:
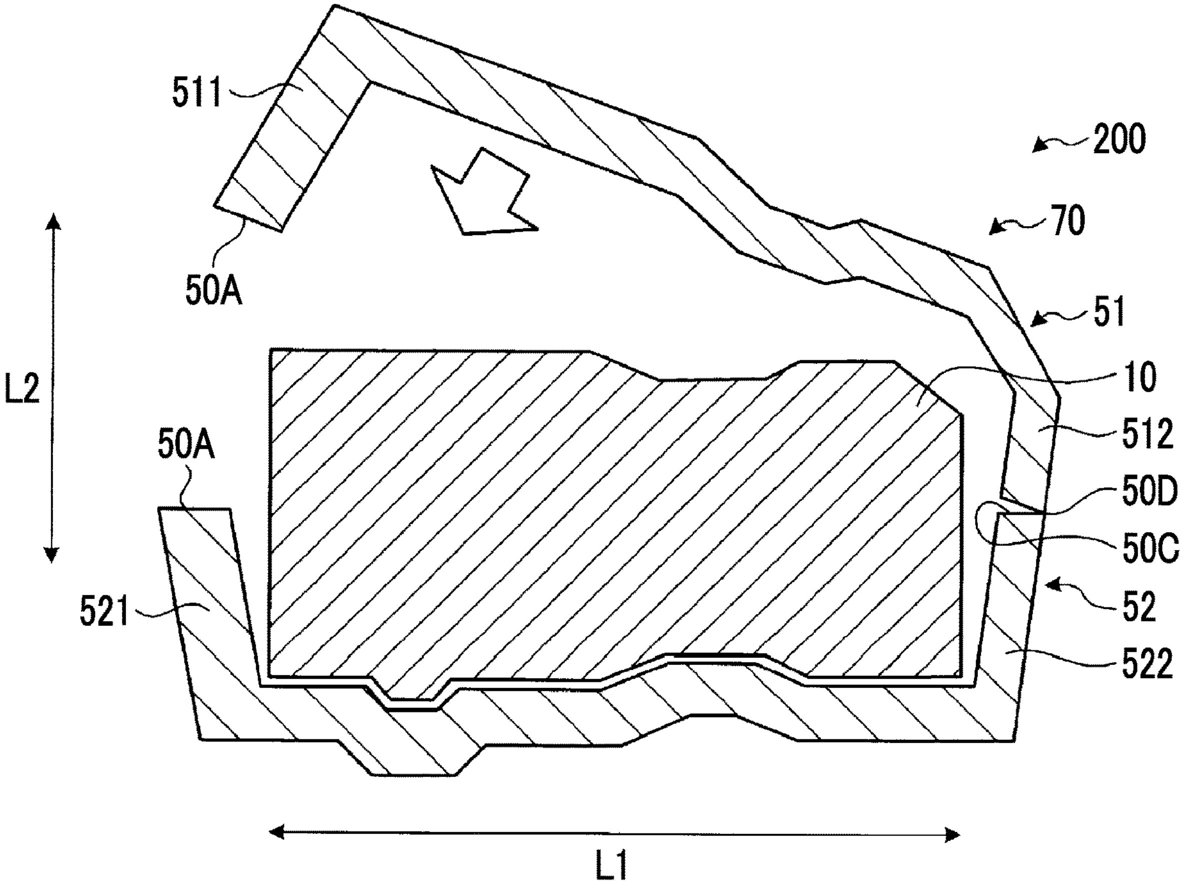
FIG. 15 is an explanatory diagram showing an acoustic cover according to a modification example of the second embodiment.

FIG. 15 is an explanatory diagram showing an acoustic cover according to a modification example of the second embodiment. As shown in the drawing, in an acoustic cover 70 according to the modification example of the second embodiment, the half portions 51 and 52 are not completely divided. The acoustic cover 70 has the divided portion 50A in the wall portion extending along the lateral direction L2 on one side. However, in the wall portion extending along the lateral direction L2 on the other side, the acoustic cover 70 has a notch portion 50C and a joint portion 50D, instead of the divided portion 50B. The notch portion 50C is provided on the inner surface 30A side in the wall portion extending along the lateral direction L2 on the other side. The half portions 51 and 52 are connected to each other at the joint portion 50D on the side of the notch portion 50C.

The acoustic cover 70 can be deformed such that the half portions 51 and 52 are opened on the divided portion 50A side with the joint portion 50D located on the side of the notch portion 50C as a base point. Therefore, as shown in FIG. 15, when, for example, the half portion 52 is disposed around the compressor body 10 in a state where the half portions 51 and 52 are opened on the divided portion 50A side, and then the half portion 51 is disposed around the compressor body 10 such that the divided portion 50A is closed, the acoustic cover 70 can be mounted to the compressor body 10. Also in the acoustic cover 70, the inclined portions 511, 512, 521, and 522 are provided in the wall portions extending along the lateral direction L2. Therefore, similarly to the acoustic cover 50 shown in FIG. 4, the gap S2 between the acoustic cover 70 and the compressor body 10 can be made small as compared with the gap S3 between the acoustic cover 60 and the compressor body 10 in the compressor 300 of the comparative example. Therefore, it is possible to suppress the formation of an extra space between the compressor body 10 and the acoustic cover 70, and it becomes possible to attain the downsizing and weight saving of the acoustic cover 70, as compared with the acoustic cover 60 of the comparative example.

Third Embodiment

Figure 16:
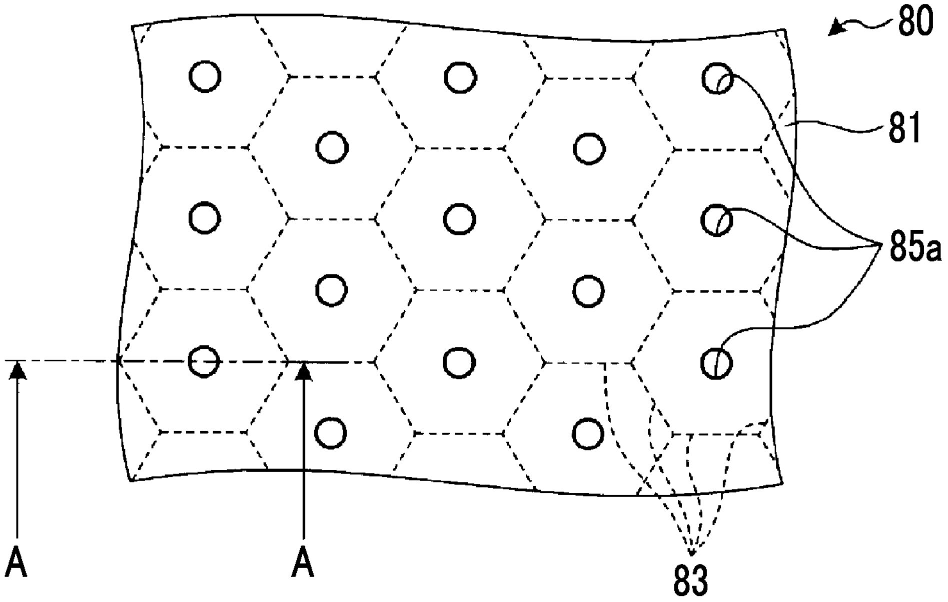
FIG. 16 is a top view showing an acoustic cover according to a third embodiment.

Next, an acoustic cover 80 of a compressor according to a third embodiment will be described. Since the compressor according to the third embodiment has the same configuration as those of the first and second embodiments except that it includes the acoustic cover 80 instead of the acoustic covers 30, 40, 50, and 70, illustration and description of the components other than the acoustic cover 80 are omitted. In the first and second embodiments, the acoustic covers 30, 40, 50, and 70 are made of a porous foam material. In the third embodiment, the acoustic cover 80 is formed of a honeycomb sandwich panel. FIG. 16 is a top view showing the acoustic cover according to the third embodiment, and FIG. 17 is a sectional view taken along line A-A of FIG. 16.

Figure 17:
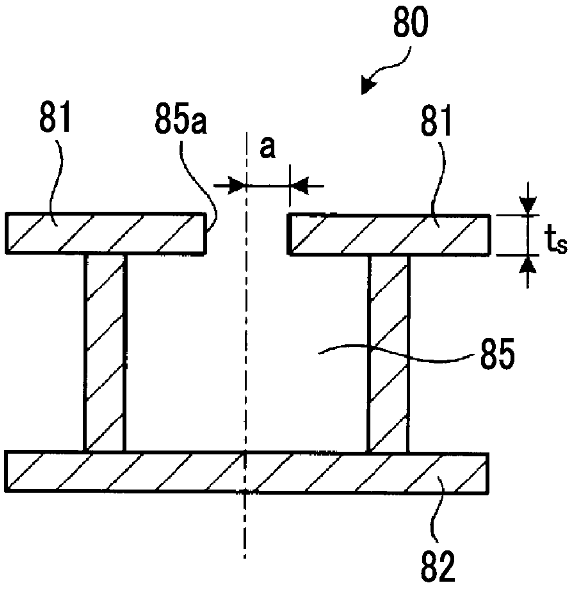
FIG. 17 is a sectional view taken along line A-A of FIG. 16.

As shown in FIG. 17, the acoustic cover 80 has a front sheet material 81, a back sheet material 82, and a plurality of honeycomb walls 83. The front sheet material 81, the back sheet material 82, and the honeycomb wall 83 can be formed, for example, by press-forming a plastic material by using a press die (not shown). The front sheet material 81 and the back sheet material 82 are disposed to face each other. The front sheet material 81 forms an inner surface 80A of the acoustic cover 80. Further, the back sheet material 82 forms an outer surface 80B of the acoustic cover 80. The plurality of honeycomb walls 83 extend between the front sheet material 81 and the back sheet material 82. As shown in FIG. 16, the plurality of honeycomb walls 83 form a partition wall having a hexagonal cross section between the front sheet material 81 and the back sheet material 82.

In this way, the front sheet material 81, each honeycomb walls 83, and the back sheet material 82 define a plurality of honeycomb cells 85 which are hexagonal columnar spaces. Then, an opening 85A is formed in the front sheet material 81 at a position corresponding to the center of each honeycomb cell 85. The opening 85A is a through-hole that penetrates the front sheet material 81. With this configuration, air vibration of sound that is emitted from the compressor body 10 proceeds into the honeycomb cell 85 through the opening 85A, and the air vibration resonates at a predetermined resonance frequency f (refer to the following expression (1)), so that pressure fluctuation is attenuated and noise is absorbed.

An opening radius a of the opening 85A provided in each honeycomb cell 85 is determined according to the following expression (1) by the Helmholtz equation. In the expression (1), "f" is a resonance frequency, "c" is a sound speed, "V" is the volume of the honeycomb cell, and "$t_s$" is the thickness of the front sheet material 81. Therefore, if the value of a desired resonance frequency f to be attenuated is determined, the opening radius a can be obtained from the expression (1). The value of the desired resonance frequency f can be determined, for example, based on the frequency of noise that is generated at the scroll provided in the compressor body 10. In other words, if the opening radius a is adjusted with respect to each of the plurality of openings 85A, it becomes possible to absorb noise of a plurality of frequencies.

$$f = c/2\pi \cdot SQRT(\pi a^2/V(t_s + 0.6a)) \tag{1}$$

Figure 18:
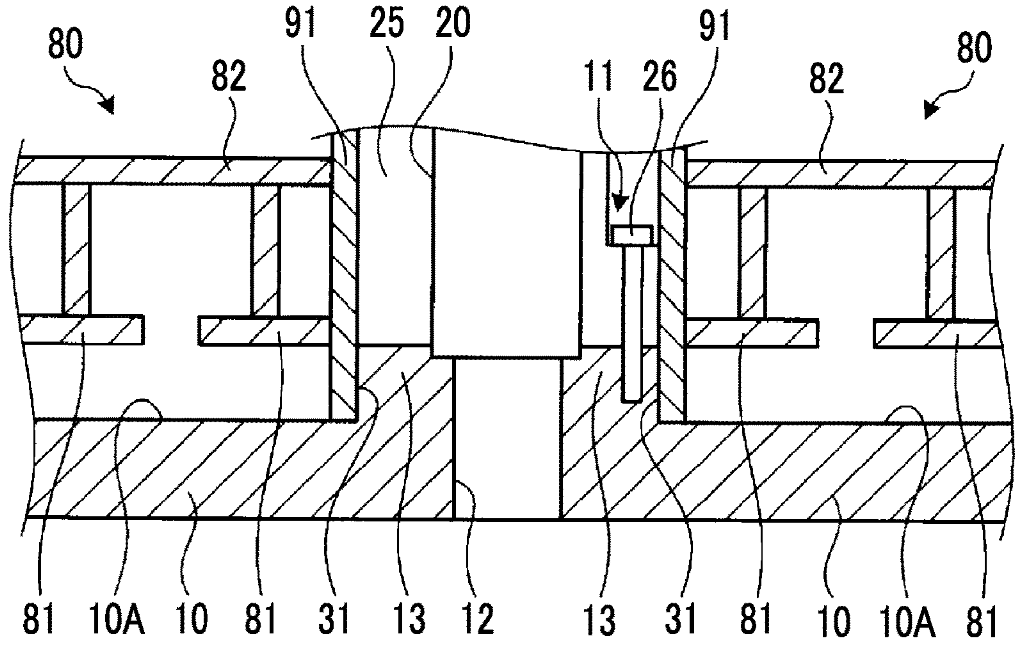
FIG. 18 is an enlarged sectional view showing the vicinity of an insertion hole of the acoustic cover in the third embodiment.

Also in the acoustic cover 80 of the third embodiment, the insertion hole 31 through which the pipe 20 is inserted is directly or indirectly brought into contact with the pipe 20, similar to the first and second embodiments. FIG. 18 is an enlarged sectional view showing the vicinity of the insertion hole of the acoustic cover in the third embodiment. Since the acoustic cover 80 is a honeycomb sandwich panel, a surface is not formed at the end portion where the insertion hole 31 is formed, as compared with the case where the acoustic cover is a porous foam material. Therefore, in the third embodiment, as shown in FIG. 18, a contact member 91 that forms a contact surface is disposed at the end portion where the insertion hole 31 is formed. That is, the contact member 91 forms the inner peripheral surface 31A of the insertion hole 31. The contact member 91 is, for example, a vibration damping sheet. In this way, similar to the first and second embodiments, the pipe 20 can be indirectly brought into close contact with the insertion hole 31 through which the pipe 20 is inserted.

Further, also in the third embodiment, if the acoustic cover 80 is divided into the two half portions 51 and 52 (refer to FIG. 4) by the divided portions 50A and 50B (refer to FIG. 4) and the inclined portions 511, 512, 521, and 522 (refer to FIG. 4) are provided at the wall portions extending along the lateral direction L2, it is possible to suppress the formation of an extra space between the compressor body 10 and the acoustic cover 80, similar to the second embodiment. In this way, it becomes possible to attain the downsizing and weight saving of the acoustic cover 80, as compared with the acoustic cover 60 of the comparative example. In the third embodiment, since the acoustic cover 80 is manufactured by press-forming, the inclined portions 511, 512, 521, and 522 are formed so as to have the draft gradient θ from a press die.

Figure 19:
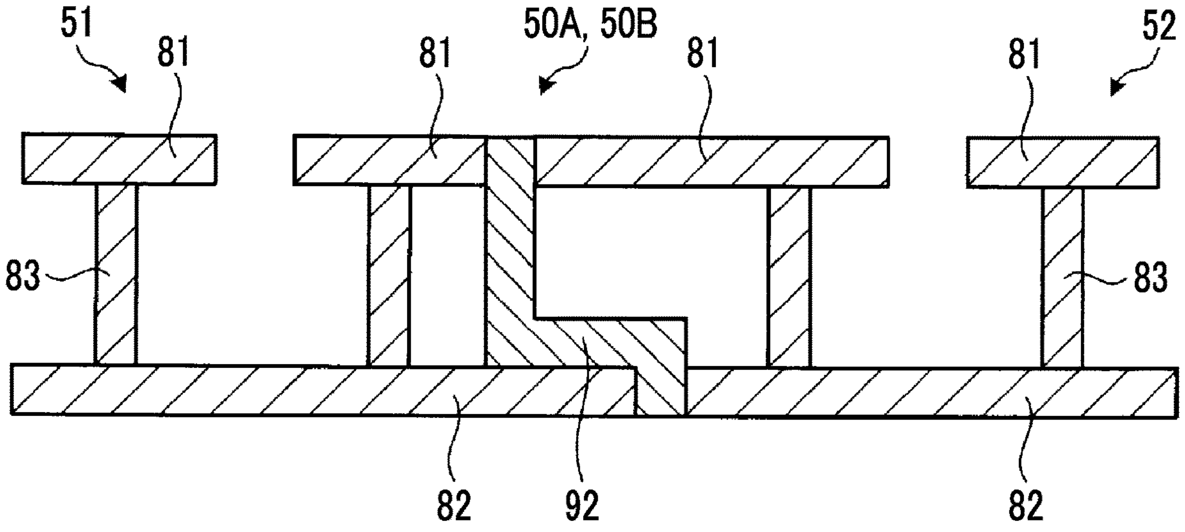
FIG. 19 is an enlarged sectional view showing an example of a structure in the vicinity of a divided portion in the third embodiment.

However, since the acoustic cover 80 is a honeycomb sandwich panel, it is difficult to provide the overlap portions 53 as shown in FIGS. 7 to 14 in the divided portions 50A and 50B. Therefore, the acoustic cover 80 is connected in the divided portions 50A and 50B with a structure which is described below. FIG. 19 is an enlarged sectional view showing an example of a structure in the vicinity of the divided portion in the third embodiment. As shown in the drawing, the acoustic cover 80 has a contact member 92 disposed between the front sheet material 81 and the back sheet material 82 of the half portion 51 and the front sheet material 81 and the back sheet material 82 of the half portion 52 at the divided portions 50A and 50B. The contact member 92 is, for example, a vibration damping sheet. In this way, since the half portions 51 and 52 can be brought into closer contact with each other at the divided portions 50A and 50B, it is possible to suppress the occurrence of sound leakage from the divided portions 50A and 50B.

In the first and second embodiments, the acoustic covers 30, 40, 50, and 70 are formed of a porous foam material, and in the third embodiment, the acoustic cover is formed of a honeycomb sandwich panel having the plurality of honeycomb cells 85. However, a configuration may be made in which a part of the acoustic cover is formed of a porous foam material and the other part is formed of a honeycomb sandwich panel. In this way, if the structure of the acoustic cover is appropriately selected according to a type of noise that is emitted from the compressor body 10, it becomes possible to more appropriately absorb a plurality of types of noise. For example, a configuration may be adopted in which a honeycomb sandwich panel is disposed in the vicinity of the scroll of the compressor body 10 and a porous foam material is disposed at the other part. In this way, fluid sound (mainly a low frequency) that is generated at the scroll can be well absorbed by adjusting the desired resonance frequency f by the honeycomb sandwich panel, and other sliding sound or sound (mainly a high frequency) due to an electric motor can be absorbed by the porous foam material.

REFERENCE SIGNS LIST

10: compressor body
10A: outer surface

11: connecting portion
12: connection hole
13: flange portion
15: protrusion
20: pipe
25: connection block
26: bolt
30, 40, 50, 60, 70, 80: acoustic cover
30A, 80A: inner surface
30B, 80B: outer surface
31: insertion hole
31A: inner peripheral surface
32: annular inclined portion
42: cylindrical portion
50A, 50B: divided portion
50C: notch portion
50D: joint portion
51, 52: half portion
53: overlap portion
54: fitting portion
55: protrusion portion
56: resin material
57: first locking portion
58: second locking portion
60, 63, 65: locking surface
81: front sheet material
82: back sheet material
83: honeycomb wall
85: honeycomb cell
85A: opening
91, 92: contact member
100, 200, 300: compressor
511, 512, 521, 522: inclined portion
S1, S2, S3: gap

The invention claimed is:

1. A compressor for an automobile air conditioning device comprising:
- a compressor body;
- a pipe connected to a flange portion that protrudes from an outer surface of the compressor body;
- a connection block fixed around the pipe and fastened to the flange portion; and
- an acoustic cover disposed around the compressor body,
- wherein the acoustic cover has an insertion hole through which the pipe is inserted, and which is indirectly brought into close contact with the pipe, and an inner surface of the acoustic cover has a shape that follows the outer surface of the compressor body, the outer surface of the compressor body and the inner surface of the acoustic cover defining a gap therebetween, and
- the insertion hole comes into contact with the flange portion, the connection block, and the outer surface of the compressor body, and
- the acoustic cover has an annular inclined portion that extends toward the compressor body around the insertion hole as the acoustic cover extends toward the insertion hole, and
- wherein the acoustic cover is a porous foam material.

2. The compressor for an automobile air conditioning device according to claim 1, wherein the acoustic cover has at least one divided portion formed in a wall portion extending along a lateral direction.

3. The compressor for an automobile air conditioning device according to claim 2, wherein the acoustic cover has an overlap portion in which half portions divided at the divided portion overlap each other at a position of the divided portion.

4. The compressor for an automobile air conditioning device according to claim 3, wherein the overlap portion is a fitting portion that fits the half portions to each other.

5. The compressor for an automobile air conditioning device according to claim 3, wherein the acoustic cover has a protrusion portion that protrudes from the outer surface thereof at a position of the overlap portion.

6. The compressor for an automobile air conditioning device according to claim 3, wherein the acoustic cover has a resin material inserted at a position of the overlap portion.

7. The compressor for an automobile air conditioning device according to claim 3, wherein the compressor body has a protrusion that protrudes from the outer surface thereof, and
- the overlap portion of the acoustic cover comes into contact with the protrusion.

8. The compressor for an automobile air conditioning device according to claim 3, wherein the overlap portion is a locking portion that locks the half portions to each other,
- the locking portion includes a first locking portion that is provided in one of the half portions, and a second locking portion that is provided in the other of the half portions and is locked to the first locking portion,
- a plurality of locking surfaces is formed on surfaces of the first locking portion and the second locking portion that face each other, and
- the plurality of locking surfaces include at least
- first locking surfaces that come into contact with each other when the first locking portion and the second locking portion relatively move in a direction in which the first locking portion and the second locking portion approach each other, and
- second locking surfaces that come into contact with each other when the first locking portion and the second locking portion relatively move in a direction in which the first locking portion and the second locking portion are separated from each other.

9. The compressor for an automobile air conditioning device according to claim 1, wherein the acoustic cover is a honeycomb sandwich panel having a plurality of honeycomb cells, and has a plurality of openings formed on the inner surface corresponding to the plurality of honeycomb cells.

10. The compressor for an automobile air conditioning device according to claim 9, wherein the acoustic cover has at least one divided portion formed in a wall portion extending along a lateral direction.

* * * * *